(12) United States Patent
Peterswerth et al.

(10) Patent No.: US 9,614,382 B2
(45) Date of Patent: Apr. 4, 2017

(54) SHORT-CIRCUIT PROTECTION DEVICE (71) Applicant: Robert Bosch GmbH, Stuttgart (DE)

(72) Inventors: Andreas Peterswerth, Nuremberg (DE); Georg Sebastian, Marbach A.N. (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 14/811,917

(22) Filed: Jul. 29, 2015

(65) Prior Publication Data
US 2016/0036252 A1 Feb. 4, 2016

(30) Foreign Application Priority Data

Jul. 30, 2014 (DE) .................. 10 2014 214 984

(51) Int. Cl.
*H02J 7/00* (2006.01)
*H02H 7/122* (2006.01)

(52) U.S. Cl.
CPC .......... *H02J 7/0026* (2013.01); *H02J 7/0014* (2013.01); *H02J 7/0021* (2013.01); *H02J 7/0063* (2013.01); *H02J 2007/0067* (2013.01)

(58) Field of Classification Search
CPC .................................................. H02J 7/0042
USPC ........................................................ 320/134
See application file for complete search history.

(56) References Cited

U.S. PATENT DOCUMENTS

| | | | |
|---|---|---|---|
| 5,583,424 A | 12/1996 | Sato et al. | |
| 5,744,936 A | 4/1998 | Kawakami | |
| 6,246,214 B1 | 6/2001 | Oglesbee | |
| 6,815,930 B2 | 11/2004 | Goodman | |
| 8,278,882 B2 * | 10/2012 | Gotou | B60L 3/003 320/111 |
| 2002/0079865 A1 | 6/2002 | Thomas et al. | |
| 2002/0175644 A1 | 11/2002 | Su | |
| 2002/0186576 A1 * | 12/2002 | Kanouda | H02J 9/061 363/125 |
| 2011/0285538 A1 | 11/2011 | Lee et al. | |

FOREIGN PATENT DOCUMENTS

| | | |
|---|---|---|
| DE | 197 12 261 A1 | 10/1998 |
| WO | 2008/055493 A1 | 5/2008 |
| WO | 2010/089338 A2 | 8/2010 |

* cited by examiner

*Primary Examiner* — Edward Tso
*Assistant Examiner* — Ahmed Omar
(74) *Attorney, Agent, or Firm* — Maginot, Moore & Beck LLP (57) ABSTRACT

A short-circuit protection device for limiting a battery current of a battery strand having at least one battery cell and for guiding an output current to a consumer network via a first network terminal and a second network terminal connected to the short-circuit protection device, the short-circuit protection device compring: a first switching element configured to interrupt the battery current to limit the output current; at least one current detection means; a comparison arrangement configured to compare the output current with a predefined target value; at least one inductor arranged series with the switching element; an inductor current regulation arrangement configured to actuate the switching element; and a first bridge device configured to bridge at least one battery cell of the battery strand and limit the predefined target value to a predefined maximum value of a short-circuit current.

10 Claims, 7 Drawing Sheets

SHORT-CIRCUIT PROTECTION DEVICE

This application claims priority under 35 U.S.C. §119 to application no. DE 10 2014 214 984.3, filed on Jul. 30, 2014 in Germany, the disclosure of which is incorporated herein by reference in its entirety.

BACKGROUND

The disclosure relates to a device for limiting a current delivered by a battery strand.

Battery systems are used increasingly as energy stores for both stationary and mobile applications. Examples of the stationary use include wind turbines and emergency power systems, and examples of the mobile use include electric and hybrid vehicles.

Here, battery systems that are based on lithium-ion battery cells are often used. For this purpose a multiplicity of battery cells are generally connected in series to form battery modules. Battery strands are produced by connecting a plurality of battery modules in series. In powerful battery systems, also referred to hereinafter as batteries, a plurality of battery strands are often connected in parallel.

For electrical energy stores with high energy density, battery cells with low internal resistances are especially used, which can deliver relatively high powers with moderate heating. In particular, lithium-ion batteries on account of a very low internal resistance have the property of being able to deliver very high currents compared with previously known batteries. A short-circuit current delivered by a lithium-ion battery thus exceeds those of previously known batteries several times over.

Battery-based energy stores are particularly suitable for networks with high demands on availability, as exist for example in vehicles such as cars or submarines. So as not to impair the availability of these networks in the event of a fault of individual consumers, it is necessary to separate fault sources quickly and reliably from the network in the event of a short circuit. For this purpose, the individual consumers are usually operated via fuses or circuit breakers with electromagnetically actuated overcurrent detection at the network. In order to enable the tripping of these protective elements, the battery system as current source in a network must be able to deliver the necessary short-circuit current. In the case of battery systems with low impedance, the provision of minimal current intensity in order to trip the protective elements is unproblematic. However, the property of such battery systems to deliver extremely high short-circuit currents extremely quickly in the event of a short circuit is critical. A quick, complete separation of the network and battery system is not expedient in this case on account of the loss of the availability of energy. Protection against overload the network can be provided by way of example by an accordingly robust design of the networks with accordingly dimensioned protective elements. Alternatively, arrangements can be used that limit a rise of the current already at the power source, i.e. the battery, in the event of a fault.

A device that is suitable for limiting DC currents in high-energy DC current networks is known from document WO-2010/089338 A2. The short-circuit protection device uses an ohmic resistor to limit the currents. This resistor is connected into the energy path by means of a quick current monitoring and power semiconductors. A current delivered by a battery strands is limited purely digitally by the connection/bridging of the resistor.

A device for controlling a three-phase electric machine, which device has energy stores, connectable in sub-units, in the form of DC voltage sources which can be connected and disconnected and also a downstream inverter, is known from document US 2002/0175644 A1. The connection and disconnection of DC voltage sources is performed by a control unit. A protection device for limiting the current delivered by the energy store in the event of a fault is not described in document US 2002/0175644 A1.

Document WO 2008/055493A1 describes a submarine direct current network with high-energy stores. Here, battery cells and battery modules are connected with as little inductance as possible. A monitoring arrangement for monitoring battery strands is described, which transmits measurement data to a control arrangement and is suitable for deactivating a battery strand.

Semiconductors as protective elements limiting a rise in current are also provided. A control or regulation of a short-circuit current occurring in the event of a fault is not described.

U.S. Pat. No. 6,246,214 B1 describes a protective circuit for the charging of a battery. This protective circuit contains a field effect transistor, which can limit the flow of current when charging or discharging the battery. The circuit additionally contains a discharge regulation system, which is coupled to the field effect transistor and which is able to determine an excessively strong flow of current in the system and to then transmit a signal to the field effect transistor to limit the flow of current. This may be the case in particular when a short circuit is present in the battery. The use of a current converter for this purpose is not described.

U.S. Pat. No. 6,815,930 B2 describes a protective circuit for a battery cell. The protective circuit consists inter alia of a MOSFET transistor, which is connected in series to the battery cell to be protected. When a voltage that is lower than a predefined voltage is measured in the battery cell to be protected, the MOSFET transistor then changes its state and thus limits the flow of current through the battery cell.

Furthermore, document US 2011/0285538 A1 describes an apparatus and a method for determining an abnormality in a compensating circuit for battery cells.

Document US 2002/0079865 A1 describes a protective circuit for a charging unit and a chargeable element, such as a rechargeable lithium-ion battery.

SUMMARY

The present disclosure relates to a short-circuit protection device for limiting a current $I_E$ deliverable by a battery strand comprising at least one battery cell, it being possible to limit the current $I_E$ deliverable by the battery strand by means of the short-circuit protection device to a controlled output current $I_A$ and it being possible to guide the output current $I_A$ through a consumer network via two network terminals connectable to the short-circuit protection device, it being possible, by means of a connection of the network terminals to the consumer network, to form a first power circuit via the battery strand, the network terminals and the consumer network, a switching element being arranged in the first power circuit, by means of which the current $I_E$ can be interrupted for limitation to the output current $I_A$, the short-circuit protection device also having at least one current detection means arranged in such a way that the magnitude of the output current $I_A$ can be determined by this current detection means, the short-circuit protection device also having a comparison arrangement for comparing the magnitude of the output current $I_A$ with a predefinable target value $I_S$, characterized in that the short-circuit protection device also has an inductor, which is arranged in series with the switching element and on the consumer network side relative thereto, in that the short-circuit protection device has an inductor current regulation arrangement, which can be fed a signal from the comparison arrangement and via which the output current $I_A$ flowing through the inductor can be regulated by means of an actuation of the switching element, and in that the short-circuit protection device also has a bridge device in the form of a switch or a diode, which is arranged such that, in the event of an interruption of the current $I_E$ by the switching element, at least one battery cell of the battery strand can be bridged and a second power circuit for the output current $I_A$ via the network terminals, the consumer network and the inductor can be closed, and in that the target value $I_S$ can be limited to a predefinable maximum value of a short-circuit current $I_K$.

An advantage of this device lies in the fact that, as a result thereof, a current-limiting current transformer is formed, by means of which the operating reliability of a DC voltage network can be increased in the form of a quick short-circuit and overload current limitation. Furthermore, overload currents which also lie only slightly above a maximum operating current can be reliably identified and limited. Furthermore, a consumer network protected in this way can continue to be supplied with energy from the battery strand even in the event of a short-circuit or overload.

The fact that a current converter is formed by the previously described short-circuit protection device also offers the advantage that an output current $I_A$ for a battery strand can be adjusted by a predefinable target value $I_S$. A controlled parallel connection of strands of different voltage level for common energy supply can thus be provided. Battery strands with different state of charge (SOC) or different state of health (SOH) can thus be operated in parallel as independent current sources. Furthermore, different powers can be removed from battery strands of different voltage level in order to compensate for states of charge (balancing). The output current $I_A$ of a battery strand with short-circuit protection device cannot only be limited to a maximum, but also to a minimum output current $I_A$.

Furthermore, configuration faults within the switchable and reconfigurable battery system can be intercepted without destruction by the short-circuit protection device. With a bidirectional embodiment of the current converter, the charging current can additionally be limited. In addition, the short-circuit protection device is well suited for protecting battery strands with high intrinsic impedance. Furthermore, a target value $I_S$ to be delivered by a battery strand can be controlled by a consumer network or the maximum delivered output current $I_A$ can be limited. Due to a limitation of the output current $I_A$, the associated power can additionally be limited, for example in order to observe technical provisions or technical specifications in legal provisions, for example a power output ≤100 KW in accordance with "Renewable Energies Law EEC 2012".

The short-circuit protection device is advantageously formed in such a way that, by means of the inductor, the inductor current regulation arrangement, the switching element and the bridge device, a downstream current converter, also referred to as a buck converter, is formed, which has a capacitor, arranged in particular between the network terminals, for smoothing the output current $I_A$. A short-circuit protection device of this type is to be formed in a simple manner with few components.

During operation the short-circuit protection device is fed on the input side with a current $I_E$. The current $I_E$ is limited by the short-circuit protection device and is fed as output current $I_A$ to a consumer network Here, in accordance with the principle of a buck converter, the short-circuit device may consist fundamentally of a switching element, an inductor, a bridge element and an inductor current regulation arrangement, which controls the switched state of the switching element. An interruption of the current $I_E$ by the switching element causes the inductor to deliver its energy, stored in the form of an electric field, until the field in the form of a persistent coil current reducing over time is depleted. The coil current flows in a closed power circuit from the inductor as output current $I_A$, via the network terminals with the consumer network located therebetween, via the bridge device, back to the inductor.

A closing of the switching element leads to a renewed, increasing build-up of the electric field of the inductor, combined with an increasing output current $I_A$, which is ultimately limited by the voltage of the battery strand and the impedance of the consumer network. It is thus clear that, by means of a particularly temporary, i.e. temporally limited, possibly repeated successive interruption of the current $I_E$, this can be limited to an output current $I_A$ with limits that can be adjusted in a defined manner.

The short-circuit protection device has at least one means for current detection, with which the magnitude of the output current $I_A$ is determined The magnitude of the output current $I_A$ is fed with a signal $\sim I_A$, i.e. a signal proportional to the output current $I_A$, to a comparison arrangement, which compares the measured output current $I_A$ with a reference variable $\sim I_S$, i.e. proportional to a predefinable target value $I_S$. Here, the target value $I_S$ is limited by a predefinable value of a short-circuit current $I_K$. In other values the target value $I_S$ may lie below the short-circuit current $I_K$ in a predefinable positive range. Here, the short-circuit current $I_K$ is advantageously defined in such a way that it lies above an output current $I_A$ occurring during regular operation of the consumer network, but at the same time below a maximum admissible output current $I_A$. The reference variable may advantageously be determined as a signal proportional to the minimum from the target value $I_S$ and the value of the short-circuit current $I_K$, i.e. in other words the magnitude of the target value $I_S$ is advantageously limited by the magnitude of the predefinable value of the short-circuit current $I_K$. If no target current $I_S$ is predefined to the short-circuit protection device, the reference variable thus corresponds to a signal $\sim I_K$, i.e. a signal proportional to the short-circuit current $I_K$.

The inductor current regulation arrangement is fed a signal as control variable from the comparison arrangement, on the basis of which signal the inductor current regulation arrangement controls an opening or closing of the switching element. This can be performed both statically and in rapid sequence in the form of a pulsing or pulse-width modulation.

A rapid sequence of switched states of the switching element, for example in accordance with a pulse-width modulation, leads to a corresponding sequence in the rise and fall of the output current $I_A$ and thus to a ripple of the output current $I_A$. This ripple of the output current $I_A$ is advantageously smoothed by an arrangement of a capacitor between the network terminals.

The short-circuit protection device is advantageously designed in such a way that the short-circuit protection device has at least two inductors, switching elements and bridge devices, by means of which a double synchronous converter is formed. In other words the short-circuit protection device has at least two inductors, at least two switching elements and at least two bridge devices in order to form a double synchronous converter.

A design of this type offers the advantage that two current converters can be formed, which contribute alternately to the supply of the output current $I_A$ by control of their switching elements in a suitable chronological sequence, such that the ripple of the output current $I_A$ can be reduced.

Furthermore, the short-circuit protection device is advantageously designed in such a way that the battery strand has a number of n=N battery cells and at least one bridge device bridges at least k battery cells, such that, in the event of an interruption of the current $I_E$ by the switching element, n–k battery cells continue to contribute to the output current $I_A$ deliverable by the short-circuit protection device. This design also offers the advantage that the ripple of the output current $I_A$ is reduced. This design, with a corresponding selection or control of the number k of bridged battery cells, also allows the voltage of the portion of the battery strand permanently contributing to the output current $I_A$ to vary and thus additionally to control the output current $I_A$.

The short-circuit protection device is advantageously also designed in such a way that the battery strand has a number of n=N battery cells and at least one bridge device bridges exactly one battery cell, such that, in the event of an interruption of the current $I_E$ by the switching element, n-1 battery cells continue to contribute to the output current $I_A$ deliverable by the short-circuit protection device. This design offers the advantage that the ripple is determined merely by the voltage difference caused by an individual battery cell and the ripple of the output current $I_A$ is thus reduced very significantly.

The short-circuit protection device is advantageously designed in such a way that the short-circuit protection device has a plurality of inductors connected in series, which are associated with a plurality of battery modules.

This design offers the advantage that a current converter can be formed via each battery module. This design also offers the advantage that the inductors associated with the battery modules, also referred to hereinafter as module inductors, are connected in series and add together their inductive effects to form an overall inductor.

In other words, the inductor of the short-circuit protection device is advantageously formed by a plurality of module inductors acting in series. This embodiment offers the advantage that, in order to attain the same inductive effect, a plurality of module inductors, which are therefore smaller, can be formed within the battery strand instead of one inductor, which is generally arranged outside the battery strand.

The short-circuit protection device is also advantageously designed in such a way that a battery module has exactly one battery cell with an inductor associated with this battery cell and connected in series therewith. In this design an individual battery cell can be considered as a battery module or a battery module can be considered as a battery cell. This design offers the advantage that a current converter can be formed via each battery cell. This design also offers the advantage that the inductors associated with the battery cells, also referred to hereinafter as cell inductors, are connected in series and add together their inductive effects to form an overall inductor.

The short-circuit protection device is thus also designed advantageously in such a way that the short-circuit protection device has a plurality of inductors connected in series, which are associated with a plurality of battery cells. In other words, this design offers the advantage that, in order to attain the same inductive effect, many more cell inductors, which are therefore much smaller for example, can be formed within the battery strand instead of one inductor, which is generally arranged outside the battery strand.

The short-circuit protection device is advantageously also designed in such a way that the battery strand has at least one battery module or a plurality of battery modules connected in series, the at least one battery module having at least one battery cell, which can be bridged by a bridge device and has a switching element, by means of which a current $I_E$ through the at least one battery cell can be interrupted.

A short-circuit protection device formed in this way offers the advantage that a limitation of the output current $I_A$ in very narrow limits is possible with switching elements contained in the battery cells and modules. Here, the voltage of the battery strand can be controlled via the switching elements as a first advantage. As a second advantage, individual current converters can be formed additionally via individual battery modules in conjunction with module inductors, or via individual battery cells in conjunction with cell inductors. Components of a current converter formed in this way can thus be arranged advantageously within the battery strand, such that the short-circuit protection device and the battery strand are intertwined with one another at least in part.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
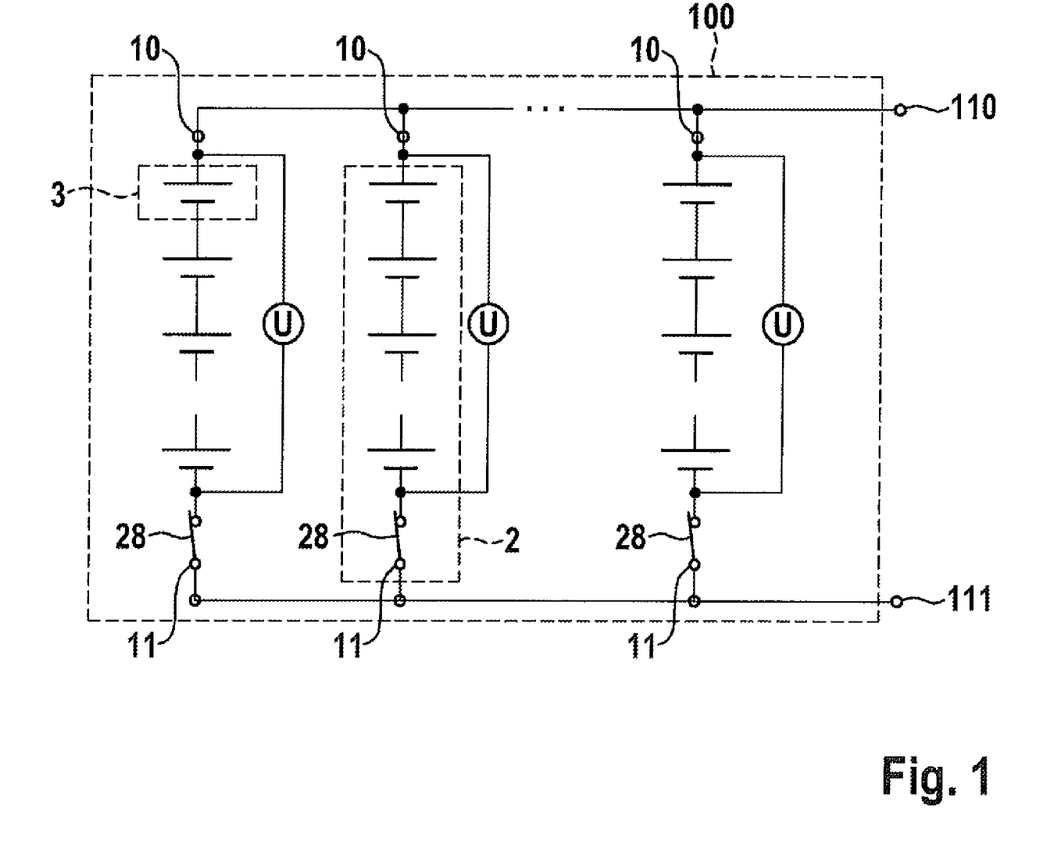
FIG. 1 shows a battery system with a plurality of battery strands arranged in parallel in accordance with the prior art.

FIG. 1 shows a battery system 100 with a plurality of battery strands 2 according to the prior art arranged in parallel, in which a voltage U is applied via the battery strands 2. The battery system 100 has two electrical connections 110, 111, via which electrical energy of the battery system 100 can be removed. The battery strands 2 arranged in parallel have a plurality of battery cells 3 and electrical connections 10, 11, by means of which they are connected in each case to the connections 110, 111 of the battery system 100. The battery strands 2 can be separated from the connection 111 via switches 28, by way of example depending on an energy demand of a consumer connected to the battery system 100. All battery strands 2 can be separated from the connection 111 in the event of a short circuit.

Figure 2:
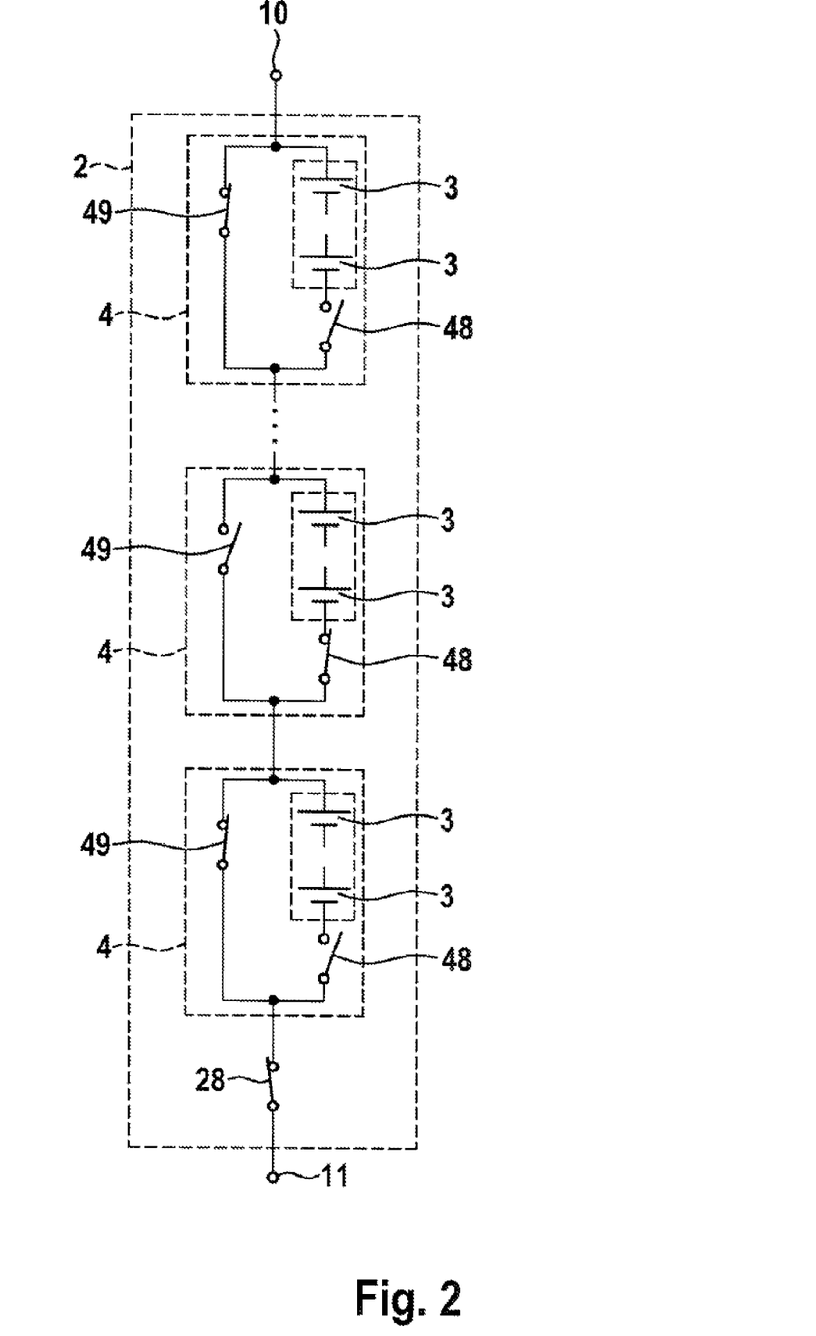
FIG. 2 shows a battery strand with a plurality of battery modules in accordance with the prior art.

FIG. 2 shows a battery strand 2 with a plurality of battery modules 4 according to the prior art. The battery strand 2 has, between connections 10 and 11, a plurality of battery modules 4 connected in series and a switch 28, via which the battery strand 2 can be connected to a consumer network or to further battery strands 2. The battery modules 4 have a plurality of battery cells 3 connected in series. The battery cells 3 in the battery strand 2 can be interconnected or bridged via two switching elements 48, 49 to be actuated in interplay.

Figure 3:
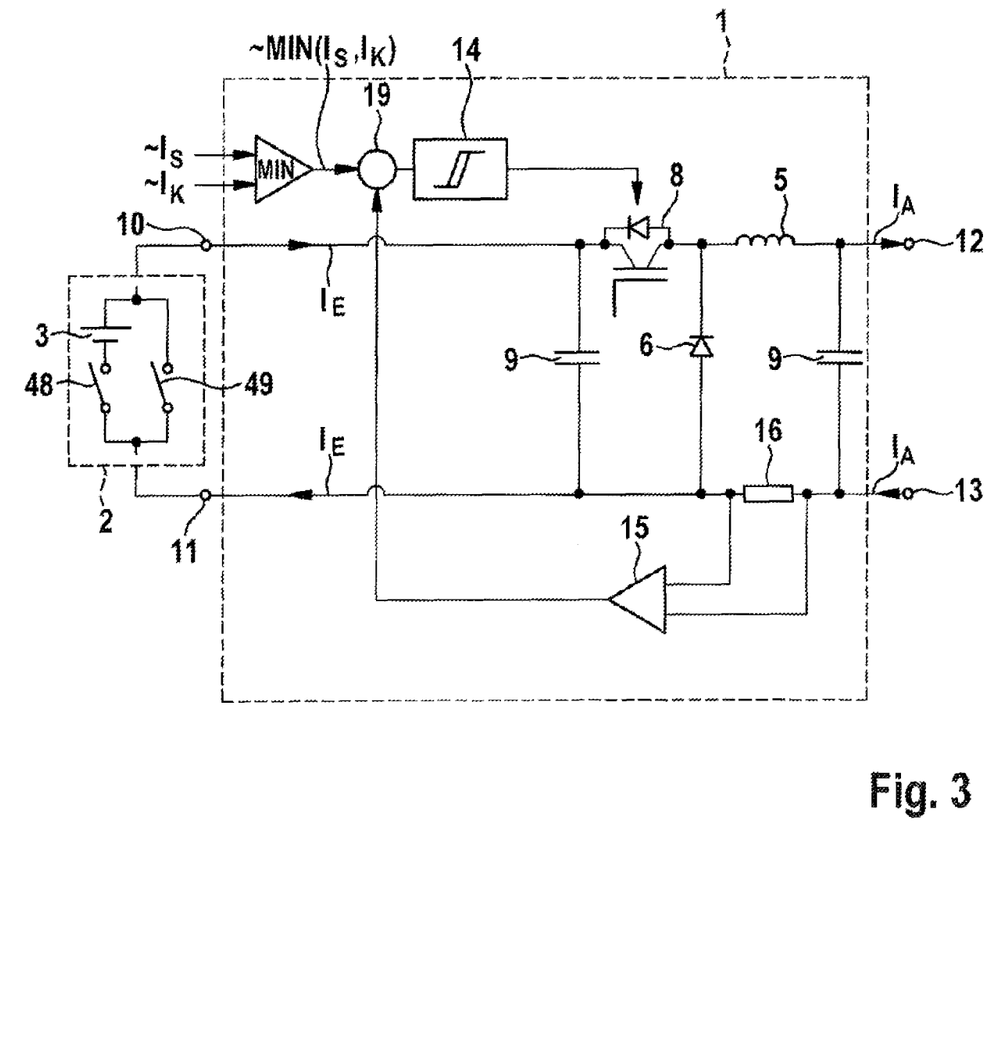
FIG. 3 shows an embodiment of a short-circuit protection device in accordance with the principle of a buck converter.

FIG. 3 shows an embodiment of a short-circuit protection device 1 with a current converter according to the principle of a buck converter. The short-circuit protection device 1 is connected on the input side to the connections 10 and 11 of a battery strand 2. On the output side the short-circuit protection arrangement 1 has network terminals 12, 13, via which the short-circuit protection arrangement is connected to a consumer network (not illustrated). The short-circuit protection device 1 is fed on the input side with a current $I_E$ by the battery strand 2, and on the output side the short-circuit protection device 1 feeds an output current $I_A$ into the consumer network.

The short-circuit protection device 1 has a switching element 8 and an inductor 5. The switching element 8 is formed in this exemplary embodiment as an FET (field effect transistor) with damping diode or as an IGBT (insulated-gate bipolar transistor). The switching element 8 and the inductor 5 are arranged in series, wherein, with regard to the order, the switching element 8 is arranged on the side of the feeding battery strand 2 and the inductor 5 is arranged on the consumer network side, i.e. on the side of the consumer network. Furthermore, FIG. 3 shows a bridge device 6 in the form of a diode and also two capacitors 9, which serve to smooth the voltages applied to the connections 10, 11 and also the network terminals 12, 13.

The exemplary embodiment also has means for current detection, which are suitable for measuring the output current $I_A$ and are embodied in the form of a shunt resistor 16 and a voltage amplifier 15. The voltage amplifier 15 delivers a voltage signal $\sim I_A$ proportional to the output current $I_A$ to a comparison arrangement 19, which compares the voltage signal $\sim I_A$ with a reference variable $\sim \text{Min}(I_S, I_K)$, i.e. a reference variable that is proportional to a minimum from a target value $I_S$ and the value of the short-circuit current $I_K$. in the event of operation exclusively for limitation of a short-circuit current $I_K$, the reference variable has a voltage signal $\sim I_K$, the short-circuit current $I_K$ being defined in such a way that it lies above an output current $I_A$ occurring during regular operation of the consumer network, but at the same time lies below a maximum admissible output current $I_A$.

An inductor current regulation arrangement 14 is fed a signal as control variable from the comparison arrangement 19, on the basis of which signal the inductor current regulation arrangement 14 controls an opening or closing of the switching element 8. This can be performed both statically and in rapid sequence in the form of a pulse-width modulation.

FIGS. 4 to 7 show further embodiments, in which individual component parts, such as the current measurement means, the inductor current regulation arrangement 14, and the bridge device 9 are not shown for reasons of clarity. Rather, the respective differences or the features distinctive for the corresponding embodiments are illustrated in this embodiment.

Figure 4:
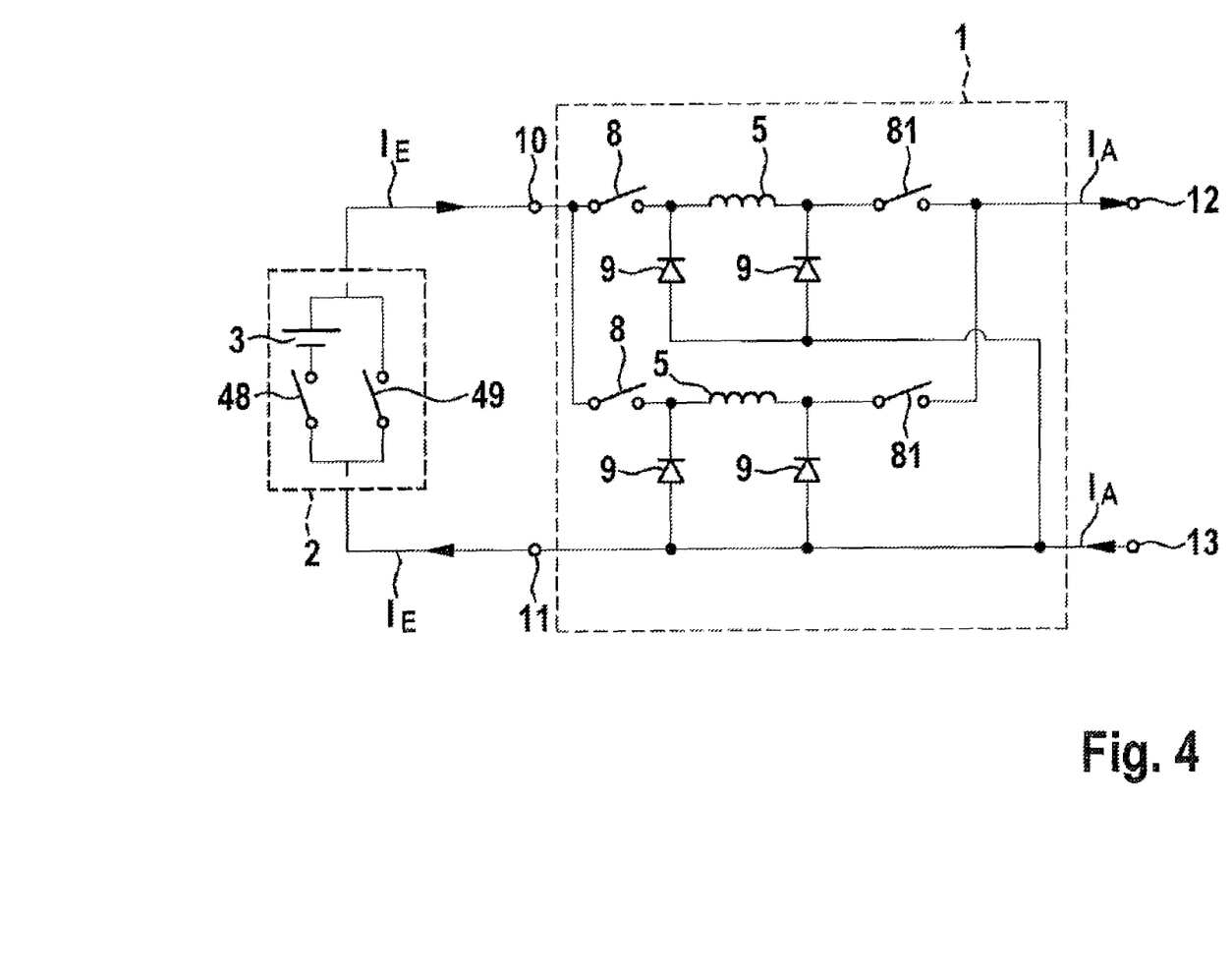
FIG. 4 shows an embodiment of a short-circuit protection device in accordance with the principle of an interleaved buck converter.

FIG. 4 shows an embodiment similar to that illustrated in FIG. 3 of a short-circuit current limiter 1, the short-circuit current limiter 1 being constructed in accordance with FIG. 4 on the basis of the principle of an interleaved buck converter. A regulation of the output current $I_A$ by means of control of the switching element 8 via a pulse-width modulation leads to a relatively strong ripple of the output current $I_A$. In order to reduce this ripple, the embodiment in FIG. 4 provides a double synchronous converter or also an interleaved buck converter. in contrast to FIG. 3 this embodiment has two switching elements 8 and also two additional switching elements 81. By means of an actuation of the switching elements 8, 81 in a suitable chronological sequence, the inductors 5 contribute in alternation to the supply of the output current $I_A$, such that the ripple of the output current $I_A$ can be reduced.

Figure 5:
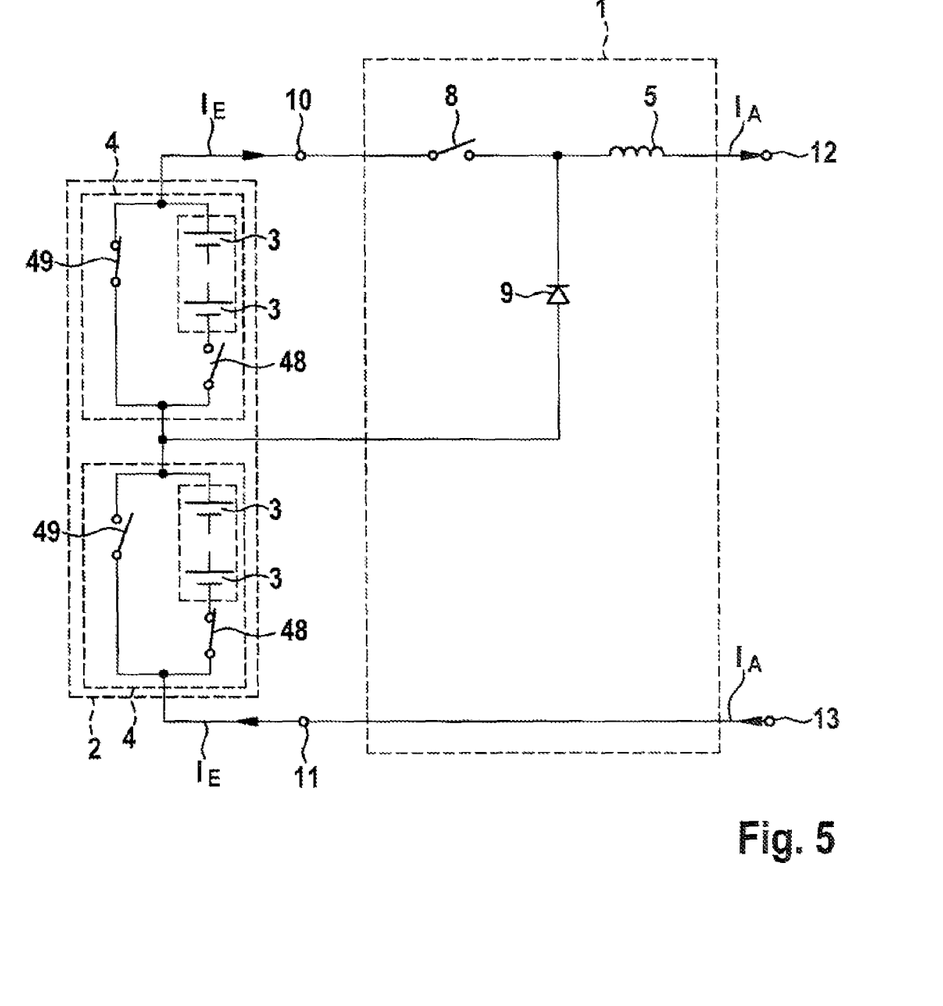
FIG. 5 shows an embodiment of a short-circuit protection device for a battery strand that can be separated partially from a consumer network.

FIG. 5 shows an embodiment of a short-circuit protection device 1 for a battery strand 2, in which the battery strand 2 can be separated partially from a consumer network. This embodiment also serves to reduce the ripple of the output current $I_A$ since part of the battery strand 2 supplies a contribution of the output current $I_A$ via the bridge device 9 independently of the switched state of the switching element 8. The ripple of the output current $I_A$ is present only to the extent that the battery cells 3 bridged by the bridge device 9 can contribute to the output current $I_A$.

Figure 6:
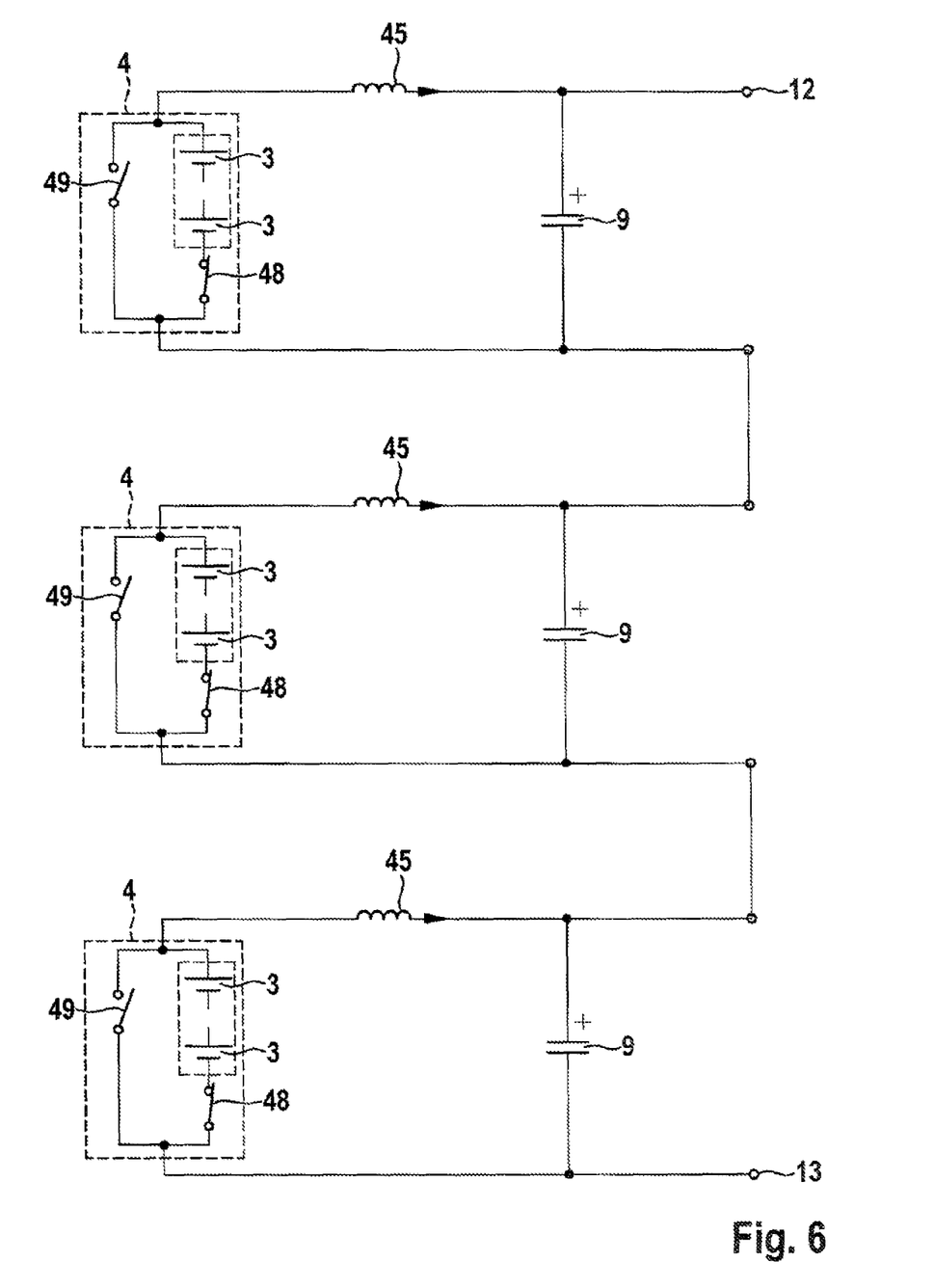
FIG. 6 shows an embodiment of a short-circuit protection device for a battery strand in which the inductor is distributed over the battery modules of the battery strand.

FIG. 6 shows an embodiment of a short-circuit protection device 1 for a battery strand 2, in which the inductor 5 is distributed over the battery modules 4 of the battery strand 2. Instead of one inductor 5, three module inductors 45 by way of example are provided in this embodiment, the value of each of which is a third of the value of the inductor 5. The switching elements 48, 49, with corresponding actuation, allow a module-based limitation of the current flowing through a battery strand 2, the switching element 49 taking on the function of a bridge device 9 and the switching element 48 taking on the function of the switching element 8.

Figure 7:
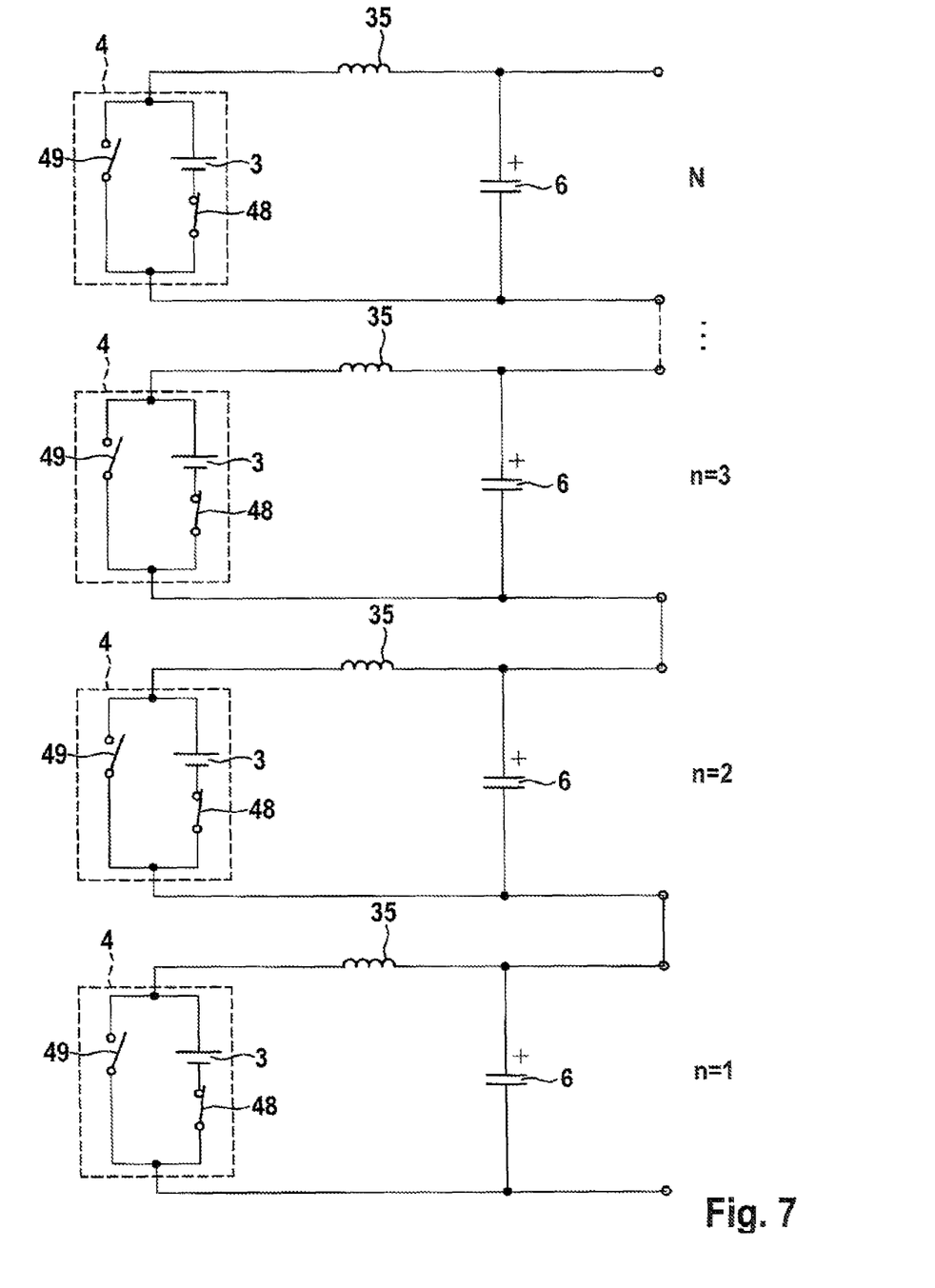
FIG. 7 shows an embodiment of a short-circuit protection device for a battery strand in which the inductor is distributed over the battery cells of the battery strand.

FIG. 7 shows an embodiment of a short-circuit protection device 1 for a battery strand 2, in which, instead of an overall inductor 5, cell inductors 35 with a number corresponding to n=N battery cells 3 of the battery strand 2 are provided. The value of the cell inductors 35 may in each case be 1/N of the value of a total inductor 5, such that the cell inductors 35 can be made smaller accordingly. The structure of the arrangement corresponds to that of FIG. 6, in which each battery module 4 has exactly one battery cell 3. With corresponding actuation, the switching elements 48, 49 allow a cell-based limitation of the current flowing through a battery strand 2, the switching element 49 again taking on the function of a bridge device 9 and the switching element 48 taking on the function of the switching element 8.

What is claimed is:

1. A short-circuit protection device for limiting a battery current of a battery strand having at least one battery cell and for guiding an output current to a consumer network via a first network terminal and a second network terminal connected to the short-circuit protection device, a first power circuit being formed by the battery strand, the first network terminal, the second network terminal, and the consumer network, the short-circuit protection device compring:
   a first switching element arranged in the first power circuit and configured to interrupt the battery current to limit the output current;
   at least one current detection means configured to determine a magnitude of the output current;
   a comparison arrangement configured to compare the magnitude of the output current with a predefined target value;

at least one inductor arranged in series with the first switching element;

an inductor current regulation arrangement configured to receive a signal from the comparison arrangement and regulate the output current flowing through the at least one inductor by actuating the first switching element; and a first bridge device comprising one of a switch and a diode and configured to, in the event of an interruption of the battery current by the first switching element, (i) bridge at least one battery cell of the battery strand, (ii) close a second power circuit for the output current via the first network terminal, the second network terminal, the consumer network, and the at least one inductor, and (iii) limit the predefined target value to a predefined maximum value of a short-circuit current.

2. The short-circuit protection device according to claim 1, wherein a downstream current converter is formed by the at least one inductor, the inductor current regulation arrangement, the first switching element, and the first bridge device, the downstream current converter further comprising:

a capacitor configured to smooth the output current.

3. The short-circuit protection device according to claim 1, wherein:

the at least one inductor includes least two inductors;

the first switching element includes at least two first switching elements;

the first bridge device comprises at least two first bridge devices; and the at least two inductors, the at least two first switching elements, and the at least two first bridge devices form a double synchronous converter.

4. The short-circuit protection device according claim 1, wherein the battery strand has a number n=N battery cells and at least one second bridge device configured to bridge at least k battery cells, such that, in the event of an interruption of the battery current by the switching element, n−k battery cells continue to contribute to the output current delivered by the short-circuit protection device.

5. The short-circuit protection device according to claim 4, wherein the at least one second bridge device of the battery strand bridges exactly one battery cell, such that, in the event of an interruption of the battery current by the switching element, n−1 battery cells continue to contribute to the output current delivered by the short-circuit protection device.

6. The short-circuit protection device according to claim 1, wherein:

the battery strand has a plurality of battery modules connected in series, each battery module of the plurality of battery modules having at least one battery cell; and the at least one inductor is connected in series with the at least one battery cell of at least one of the battery modules of the plurality of battery modules.

7. The short-circuit protection device according to claim 6, the at least one inductor comprising:

a plurality of inductors, each inductor of the plurality of inductors being connected in series with an associated battery module of the plurality of battery modules.

8. The short-circuit protection device according to claim 6, wherein the at least one of the battery modules of the plurality of battery modules with which the at least one inductor is connected in series has exactly one battery cell.

9. The short-circuit protection device according to claim 8, the at least one inductor comprising:

a plurality of inductors, each inductor of the plurality of inductors being connected in series with an associated battery cell of a battery module of the plurality of battery modules.

10. The short-circuit protection device according to claim 1, wherein the battery strand has a plurality of battery modules connected in series, each battery module of the plurality of battery modules having at least one battery cell, a second bridge device configured to bridge the at least one battery cell, and a second switching element configured to interrupt a portion of a battery current current that is contributed by the at least one battery cell.

* * * * *